United States Patent [19]

Dipoala et al.

[11] Patent Number: 5,043,703
[45] Date of Patent: Aug. 27, 1991

[54] SUPERVISION OF AUTODYNE MICROWAVE MOTION-DETECTION SYSTEM

[75] Inventors: William S. Dipoala; Daniel F. Pedtke, both of Fairport, N.Y.

[73] Assignee: Detection Systems, Inc., Fairport, N.Y.

[21] Appl. No.: 479,050

[22] Filed: Feb. 12, 1990

[51] Int. Cl.⁵ .......................................... G08B 13/18
[52] U.S. Cl. .................................. 340/554; 340/506; 340/507; 340/511; 340/513
[58] Field of Search ............... 340/554, 507, 506, 511, 340/513

[56] References Cited

U.S. PATENT DOCUMENTS 4,660,024  4/1987  McMaster ........................... 340/506
4,833,450  5/1989  Buccola et al. ..................... 340/554

Primary Examiner—Glen R. Swann, III
Attorney, Agent, or Firm—Warren W. Kurz

[57] ABSTRACT

An autodyne microwave motion-detection system includes a supervisory circuit for monitoring the operating status of the microwave energy-producing component of the system. According to a preferred embodiment, the supervisory circuit of the invention comprises a relatively low-cost, "general purpose UHF" diode, i.e. a multipurpose diode commonly used in circuits designed to accommodate UHF frequencies of up to only about 3 Gigahertz. The supervisory diode is positioned within, or in close proximity to, the resonant cavity of the microwave energy-producing element, the latter being designed to produce microwave energy at a substantially higher frequency (e.g., 10.5 Gigahertz). Due to its close proximity to the microwave energy-producing element (e.g. a Gunn diode) and its presence within the energy field produced thereby, the supervisory diode develops a small, but readily detectable, voltage whenever such element is radiating microwave energy. A voltage-sensing circuit is provided for sensing the instantaneous voltage across the supervisory diode, and the absence of a detectable voltage indicates that the microwave energy-producing element is not functional. Alternatively, the supervisory diode is replaced by an operational amplifier having a capacitor connected across its input leads, and the voltage induced on such input leads by the microwave field is detected to determine the operating status of the microwave transmitter.

6 Claims, 3 Drawing Sheets

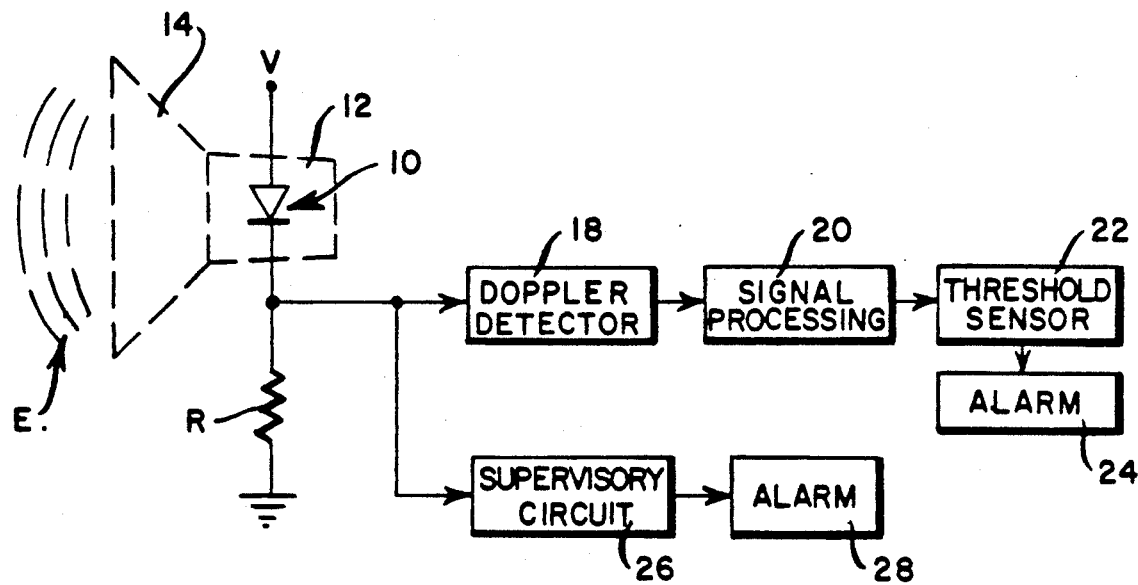
FIG.1 (PRIOR ART)
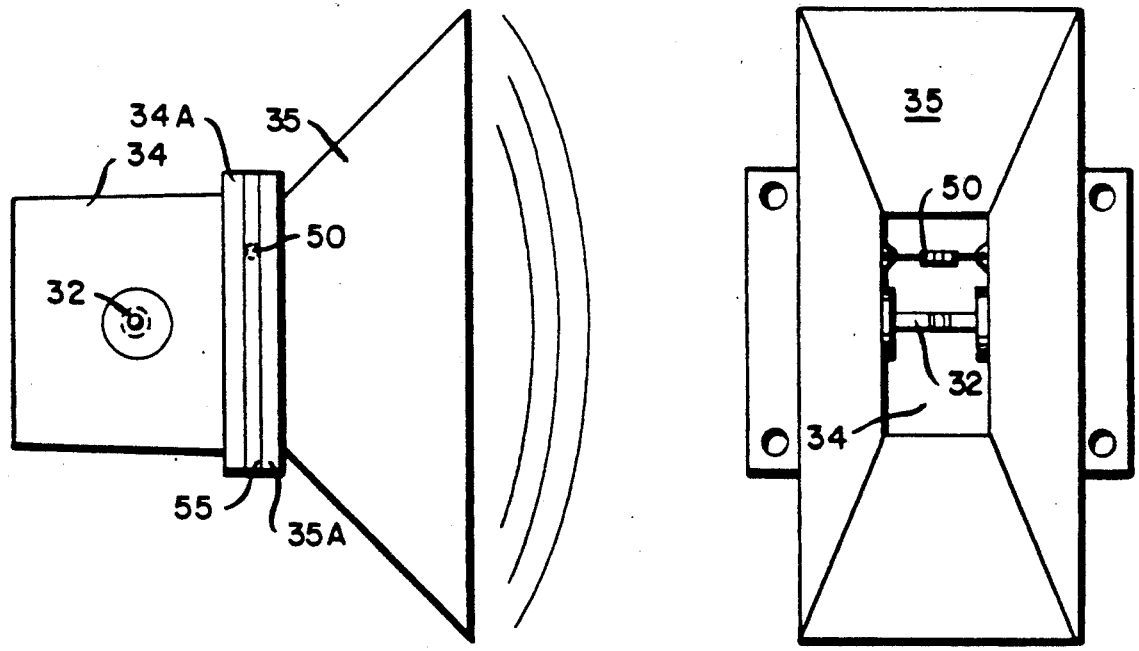
FIG. 3B
FIG. 3A

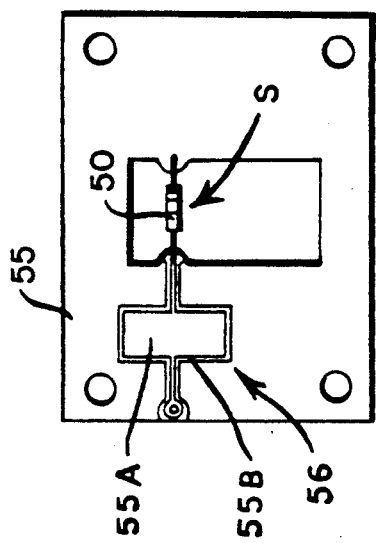
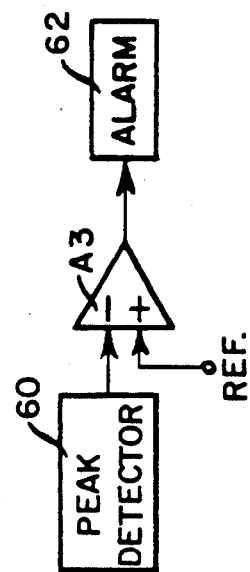
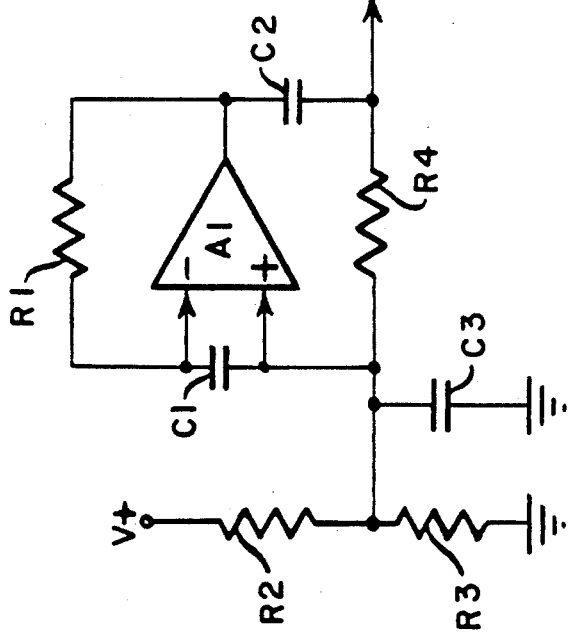
FIG. 4
FIG. 5

SUPERVISION OF AUTODYNE MICROWAVE MOTION-DETECTION SYSTEM

BACKGROUND OF THE INVENTION

The present invention relates to motion-detection systems of the microwave variety. More particularly, it relates to a supervisory circuit for monitoring the transmission of the microwave generator component and for providing a signal in the event of a transmission failure.

Over the last several decades, microwave systems have proven useful in detecting the motion of objects in a region under surveillance. Operating on the well-known Doppler principle, such systems function by transmitting microwave radiation through a region in which the motion of objects is anticipated, and monitoring the radiation reflected by objects within such region for frequency shifts caused by the Doppler effect. Such systems have long been used for tracking the motion of inanimate objects, e.g., ships, airplanes and automobiles. More recently, however, they have been used to detect the movement and, hence, presence of animate objects, e.g., intruders and pedestrian traffic, in a region under surveillance. Though the invention may find utility in all microwave detection systems, it is especially useful in intruder detection systems where the system is required to operate unattended for long periods of time with extremely high reliability.

The microwave energy-generating element of motion-detecting microwave systems of the above type often comprises a so-called "Gunn" diode which, owing to its physical make-up, can be made to osciallate at a desired microwave frequency (e.g., 10.5 Gigahertz) in response to an applied voltage. The diode is positioned within a resonant cavity which is tuned to a desired resonant frequency. The cavity cooperates with a suitable antenna, e.g. a "horn" antenna, to direct the microwave energy toward the region under surveillance. A small portion of the microwave energy reflected by objects with such region is returned to the microwave cavity where it mixes with the transmitted energy. Depending on the net direction of movement of objects irradiated by the microwave energy, the reflected energy will be shifted, up or down, in frequency relative to the transmitted energy. This frequency shift (i.e., the Doppler frequency) can be detected by either of two techniques, i.e., the heterodyne technique, or the autodyne technique.

According to the heterodyne technique, a separate receiver diode is used to monitor the reflected microwave energy. The receiver diode is specially designed to detect microwave energy of the transmitted frequency. It is structurally similar to the Gunn diode, equally costly to fabricate, and significantly more prone to failure. In the heterodyne system, the receiver diode mixes the frequencies of the transmitted and reflected energy and generates sum and difference products, the difference product being the Doppler signal representing target motion. Compared to the autodyne technique, the heterodyne technique is the more sensitive; but, as already indicated, the more costly.

The less sensitive autodyne technique affords real advantages in terms of simplicity, reliability and cost. According to the autodyne technique, sometimes referred to as the "self-detect" technique, the Gunn diode provides a double-duty of both transmitting and receiving microwave energy. In response to reflected microwave energy returning to the cavity, the current flow in the Gunn diode is modulated at the Doppler frequency. To detect this Doppler frequency, an impedance is connected between the Gunn diode and ground, and the current through the impedance is monitored. By peak-detecting the current in this impedance, the Doppler signal is obtained directly. For many applications where high sensitivity is not required, the autodyne scheme is highly preferred. Such applications include those in which there is an abundance of detectable signal.

Since microwave radiation is invisible, the operability of the microwave energy-producing element (i.e., whether it is transmitting or radiating energy or not) is not discernible by mere observation. Thus, in intrusion detection and similar applications, where the microwave system is often required to 1 reliability and without frequent status checks, it is common to incorporate a supervisory circuit which functions to provide a "trouble" signal or alarm of some sort in the event of a transmission failure. Such a supervisory circuit is especially desirable in microwave systems where the Gunn diode, by its very nature, is relatively failure-prone. For example, Gunn diodes are known to simply stop oscillating in response to certain types of ambient temperature changes or relatively small changes in the applied bias voltage. Without such supervisory circuit, there is no easy way to detect a transmission failure.

In heterodyne microwave systems, the above-mentioned supervision can be achieved by positioning the receiver diode directly within the transmitting field of the Gunn diode. Such an arrangement is disclosed, for example, in the commonly assigned U.S. Pat. No. 4,660,024 to R. L. McMaster. In addition to providing a reference signal for subsequent Doppler frequency detection, the energy received directly from the Gunn diode serves to bias the receiver "on", thereby demonstrating to a supervisory circuit that the Gunn diode is indeed transmitting, and that the receiver diode is indeed receiving.

In the simpler autodyne systems, however, supervision of the operating status of the transmitter is not as direct as in the heterodyne system. In the autodyne system, supervision is usually achieved by detecting a disruption or sudden increase in the bias current in the aforementioned impedance used to develop the Doppler signal. The problem with this type of supervision is that this type of change in the current through the bias impedance occurs only in the event the Gunn diode either shorts out or opens up, i.e., in the event of a catastrophic failure. It does not verify that the Gunn diode is actually oscillating or transmitting energy. In fact, Gunn diodes often stop oscillating without either shorting out or opening. Should this occur, it would go undetected by the supervisory circuit.

SUMMARY OF THE INVENTION

In view of the foregoing discussion, an object of this invention is to provide a more reliable supervisory circuit, preferably one of very low cost, for monitoring the operating status of a microwave energy-producing element in an autodyne microwave motion-detection system.

Another object of this invention is to provide a low-cost circuit useful in an autodyne microwave intruder detection system to provide a "trouble" alarm in the event of unauthorized "masking" of the system during periods in which the main alarm is shut-off (e.g., to enable use of the region under surveillance by authorized personnel without producing an alarm).

In accordance with the invention, this object is achieved by the provision of a supervisory circuit comprising a microwave energy sensor positioned within, or in close proximity to, the resonant cavity of the transmitter, within the energy field of the transmitter. Preferably, such sensor comprises a low-cost circuit element, such as a general purpose diode which, at the microwave frequency transmitted, is capable of producing an amplifiable signal. A particularly preferred sensor is a "general purpose UHF" diode (i.e., a multipurpose diode of the type commonly used in RF circuits designed to respond to frequencies up to about 3 Gigahertz). Due to its close proximity to the microwave energy-producing element, the sensor develops a voltage whenever the microwave energy-producing element is operating. Circuit means are provided for sensing a certain minimum voltage across the supervisory sensor and, hence, the fact that the microwave generator is, in fact, radiating energy. By sensing the microwave energy actually produced, rather than the current level in the microwave energy-producing element, the supervisory circuit of the invention is not subject to the aforementioned drawback which characterizes the prior art supervisory circuit in autodyne microwave system.

According to another preferred embodiment of the invention, an operational amplifier, positioned in the microwave energy field, is used to detect the radiated microwave energy. The voltage developed across the input leads of the amplifier by the microwave energy is used to cause the amplifier to oscillate at low frequency. Circuitry is provided to detect the low frequency oscillation and, hence the fact that the microwave transmitter is still radiating energy.

The invention and its various advantages can be better understood from the ensuing detailed description of preferred embodiments, reference being made to the accompanying drawings.

BRIEF DESCRIPTION OF THE DRAWINGS

FIG. 1 is an electrical schematic illustrating a prior art supervisory technique for microwave systems of the autodyne type;

FIGS. 3A and 3B are front and top plan views of a resonant microwave cavity illustrating the relationship between a Gunn diode and the supervisory diode comprising the supervisory circuit of the present invention;

FIG. 4 is a top plan view of a circuit board incorporating the supervisory diode shown in FIG. 3A; and FIG. 5 is an electrical schematic of an alternative supervisory circuit.

DETAILED DESCRIPTION OF THE PREFERRED EMBODIMENTS

Figure 2:
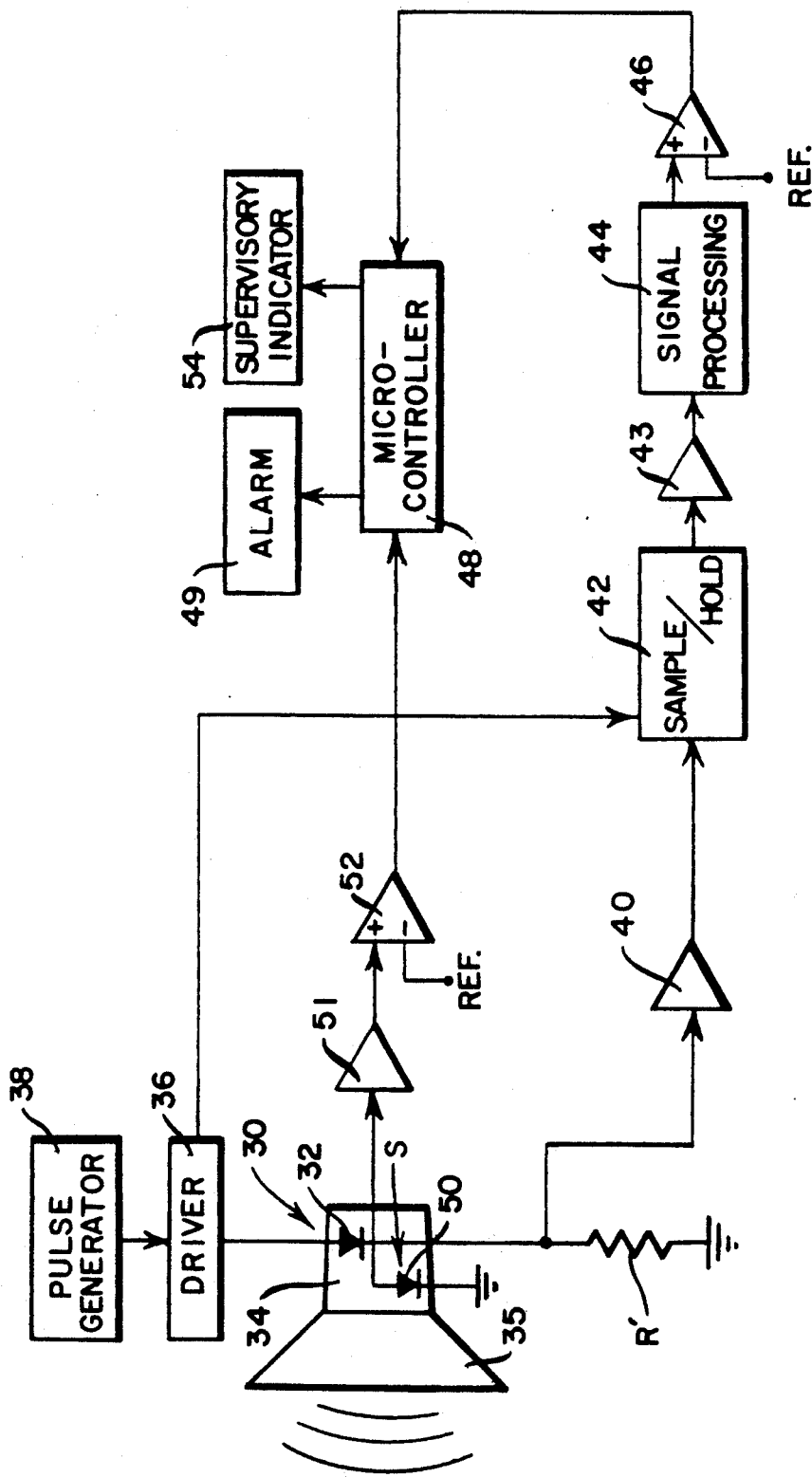
FIG. 2 is block diagram of an autodyne microwave motion detection system comprising a preferred embodiment of the invention.

Referring to the drawings, FIG. 1 illustrates the conventional scheme for detecting a transmission failure in an autodyne-type microwave motion-detection system. As shown, a Gunn diode 10 located in a resonant cavity 12 is caused to oscillate at a desired microwave frequency, typically X-Band, by the selective application of an applied voltage V. The Gunn diode may be, for example, one of the gallium arsenide Gunn diodes made and sold by M/A-COM Semiconductor Products Operation, Burlington, Me., e.g., their MA49000 Series diodes. An antenna 14 serves to direct the microwave energy E within the cavity to a region under surveillance and to receive such energy upon being reflected by objects within such region. The current flow through the Gunn diode is continuously monitored by detecting the current flow through a bias resistor R connected between the Gunn diode and ground. As indicated above, the frequency shift (i.e., Doppler frequency) caused by motion of objects in the region under surveillance can be readily detected by detecting the current waveform with a standard peak-detecting circuit 18. After processing to discriminate against spurious sources (signal processing circuit 20) and to assure that a certain minimum signal level is achieved (threshold sensor 22), the output of circuit 18 is used to activate an alarm 24 or the like. To determine whether or not the Gun diode is operating, a supervisory circuit 26 is used to monitor the Gunn diode current flow. In the event this current flow either drops to zero, indicating that the Gunn diode has opened, or suddenly rises to a new steady-state level, indicating that the Gunn diode has shorted-out, the supervisory circuit may, for example, activate an alarm 28 or simply provide a default signal which can be used to switch-over to a back-up system. It will be appreciated, however, that supervisory circuit 26 will not operate to give an alarm or provide such signal in the event the Gunn diode stops oscillating, even though it is neither shorted-out or open. As indicated above, this situation is not uncommon in microwave systems, and it is the detection of this situation which is addressed by the present invention.

In FIG. 2, an autodyne microwave system incorporating the present invention is shown to comprise a microwave generator 30 which includes a conventional Gunn diode 32, such as the one specifically mentioned above, arranged in a resonant cavity 34. Gunn diode 32 is caused to oscillate at a selected microwave frequency by the transmitted driver 36 which is periodically energized by a pulse generator 38. The Gunn diode is operated in a self-detect (autodyne) mode by monitoring the current in the Gunn diode's bias resistor R'. This current is converted to a voltage and applied to a buffer amplifier 40, and the output thereof is fed to a sample-and-hold circuit 42 which is enabled by the output of the transmitted driver. The output of the sample-and-hold is amplified by amplifier 43 and processed, in a conventional manner, by circuit 44 to distinguish the target of interest from spurious sources. After threshold detection by comparator 46, the signal is fed to a microcontroller 48 which determines whether an alarm condition has been met. If so, an alarm 49 is activated. Such circuitry is actually unrelated to the invention and is described only for the sake of completeness.

The supervisory circuit of the invention basically comprises a microwave energy-sensor S arranged within, or in close proximity to, the resonant cavity 34, within the energy field of the microwave energy-transmitting element, in this case, the field of the Gunn diode. According to a particularly preferred embodiment, sensor S comprise a "general purpose, ultra-high frequency (UHF) diode 50. Diode 50 is a "general purpose UHF" diode in the sense that it is of the type commonly used for a variety of purposes in RF circuits designed for UHF frequencies (about 0.3 to about 3.0 GHZ). Important to note is that diode 50 is not specifically designed to respond to microwave frequencies as high as those produced by the Gunn diodes (typically 10.5 gigahertz). Thus, compared to Gunn diodes and the receiver (mixer) diodes used in heterodyne systems, (e.g., the low barrier Schottky Doppler mixer diodes made by M/A-COM Semiconductor Products Operation), diode 50 is much simpler to manufacture and, hence is far less costly. In fact, the supervisory diode is more than 10 times less costly than conventional Gunn diodes, typically costing less than $0.50 versus the $5.00 plus cost for the standard Gunn or receiver (mixer) diodes. A suitable supervisory diode is one the general purpose Schottky barrier diodes, e.g., Type 5082-2800, made by Hewlett Packard, or a Type 1SS99, made by Nippon Electric Company (NEC). Only as a result of its close proximity to the Gunn diode and the strong microwave field produced by it will the supervisory diode develop a detectable voltage, and even then, at a very low amplitude. The signal developed by diode 50 in the presence of an operating Gunn diode is suitably amplified by amplifier 51 and threshold detected by differential amplifier 52, and the output of the latter is fed to microcontroller 48 which provides a transmission-failure indication in the event the amplified output of the supervisory diode falls below the predetermined threshold level.

The preferred relative positions of diode 32 and 50 within the resonant cavity of the microwave generator are shown in FIG. 3A. As shown, the respective axes of diodes 32 and 50 are preferably parallel to each other, diode 50 being arranged within one of the energy maximum of the cavity.

Referring to FIGS. 3A, 3B and 4, it will be seen that the supervisory diode 50 is supported by a circuit board 55 arranged between the forward face 34A of the resonant cavity, and the mounting plate 35A of the antenna. A low-pass filter 56 formed by the respective conductive and non-conductive portions 55A and 55B of the circuit board serves to prevent microwave energy from being emitted from the side of the cavity where the output leads of the supervisory diode are accessible.

In FIG. 5, an alternative supervisory circuit is schematically shown. In this embodiment, supervision of the microwave energy-producing element is achieved by the provision of a general purpose operational amplifier A1 having a capacitor C1 connected across its respective input leads. The op-amp is positioned so that its input leads are within or in close proximity to the microwave cavity. The length of these leads are adjusted to efficiently couple the microwave energy produced by the Gunn diode into the op-amp. A suitable lead length is about 0.75 cm., representing one-quarter of the wavelength of radiation at 10.5 GHz. Whenever the Gunn diode is radiating energy, the op-amp oscillates, apparently due to the effect of the microwave energy on the op-amp semiconductors. The oscillation frequency is determined by the R/C time constant established by the negative feedback resistor R1 and capacitor C1. The FIG. 5 circuit is powered by a small voltage source V+ (e.g., 5 volts DC). Resistors R2 and R3 determine the bias point for the amplifier, and capacitor C3 filters the power source to eliminate transients. Positive feedback resistors R4 provides a Schmitt trigger, and capacitor C2 eliminates any positive feedback for lower frequency stability. The values of resistor R1 and capacitor C1 are chosen so that the amplifier's oscillation frequency is tuned to the pulse repetition frequency produced by the pulse generator 38. The amplifier output, which is a low frequency AC signal, is passed through a buffer amplifier A2, and the output thereof is peak-detected by a peak detector circuit 60. The output of the peak detector is threshold detected by differential amplifier A3. In the event the peak detector output drops below a certain reference level, a supervisory alarm 62 is given, indicating that the microwave energy-induced oscillation has stopped and that the microwave transmitter has ceased functioning. In this embodiment, the cost of the circuit elements rivals that of an X-Band receiver diode; however, this circuit is less failure-prone and, hence more reliable.

In addition to the advantages noted above, the presence of the supervisory, microwave-sensitive circuit element in the resonant cavity provides a means for detecting tampering with the system when the system is employed for security purposes. For example, when an authorized user disables the primary alarm of the system (alarm 49, in FIG. 2), so that he may move freely within the region under surveillance without sounding an alarm, it is possible that an unauthorized person may attempt to "mask" the system (e.g., cover it with a box) so that he may later enter the protected area with detection. In the system shown in FIG. 2, such masking of the system will be detected by the supervisory diode and the supervisory alarm will be activated. In effect, the supervisory circuit behaves as a heterodyne system with a minimal detection range (e.g. a few feet, at most), owing to the relative insensitivity of the supervisory diode.

While the invention has been described with particular reference to preferred embodiments, it will apparent that obvious modifications can be made without departing from the spirit of the invention.

We claim:

1. An autodyne microwave motion-detection system comprising:
   a) microwave energy-transmitting means for transmitting microwave energy of predetermined frequency into a region under surveillance, said energy-transmitting means comprising a microwave energy-producing element arranged in a resonant cavity and responsive to an applied voltage for producing a field of microwave energy;
   b) detection circuit means operatively connected to said microwave energy-producing element for detecting, from any change is current flow in said element, a difference in frequency between the energy produced by said element and the energy reflected back to said element by objects within said region, said detection circuit means being adapted to provide a Doppler signal representative of said difference in frequency;
   c) signal processing means operatively coupled to said detection circuit means for providing an alarm signal in response to predetermined characteristics of said Doppler signal; and
   d) supervisory circuit means for detecting the operating status of said energy-producing means, said supervisory circuit means comprising a microwave energy-sensor arranged within said field of microwave energy, in close proximity to said microwave energy-producing element, for directly sensing microwave energy produced by said element and for producing a supervisory signal proportional to the energy sensed, and means for providing a supervisory alarm in the event said supervisory signal exceeds for falls below a predetermined threshold level.

2. The apparatus as defined by claim 1 wherein said microwave energy-sensor is arranged within said cavity.

3. The apparatus as defined by claim 1 wherein said microwave energy-sensor comprises a general purpose diode.

4. The apparatus as defined by claim 1 wherein said microwave energy-sensor comprises a general purpose Schottky barrier diode adapted for use at UHF frequencies.

5. The apparatus as defined by claim 1 wherein said microwave energy-sensor comprises an operational amplifier having a pair of input leads and a capacitor connected therebetween, and wherein said supervisory circuit means further comprises a second detection circuit for detecting an oscillation of said operational amplifier as produced by a voltage produced on said leads by said field of microwave energy.

6. The apparatus as defined by claim 5 wherein said said detection circuit comprises a peak detector for peak-detecting the output of said amplifier, and a threshold detector for detecting a predetermined drop in level of the peak detector output.

* * * * *